United States Patent
Hickling

(10) Patent No.: US 6,748,025 B1
(45) Date of Patent: Jun. 8, 2004

(54) DIRECT CONVERSION DELTA-SIGMA RECEIVER

(75) Inventor: Ronald M. Hickling, Newbury Park, CA (US)

(73) Assignee: TechnoConcepts, Inc.

( * ) Notice: Subject to any disclaimer, the term of this patent is extended or adjusted under 35 U.S.C. 154(b) by 0 days.

(21) Appl. No.: 09/241,994

(22) Filed: Feb. 2, 1999

(51) Int. Cl.⁷ ................................................ H03M 3/02
(52) U.S. Cl. ..................... 375/316; 375/247; 341/143
(58) Field of Search ................................ 375/244, 247, 375/316; 341/143

(56) References Cited

U.S. PATENT DOCUMENTS

| | | | | |
|---|---|---|---|---|
| 4,868,487 A | * | 9/1989 | Ryder | 324/617 |
| 5,241,310 A | * | 8/1993 | Tiemann | 341/143 |
| 5,245,343 A | * | 9/1993 | Greenwood et al. | 341/143 |
| 5,442,353 A | * | 8/1995 | Jackson | 341/143 |
| 5,736,848 A | * | 4/1998 | De Vries et al. | 324/142 |
| 5,754,131 A | * | 5/1998 | Ribner et al. | 341/143 |
| 5,835,042 A | * | 11/1998 | Ichimura et al. | 341/143 |
| 5,866,969 A | * | 2/1999 | Shimada et al. | 310/318 |
| 6,005,506 A | * | 12/1999 | Bazarjani et al. | 341/143 |
| 6,075,820 A | * | 6/2000 | Comino et al. | 375/245 |
| 6,140,952 A | * | 10/2000 | Gaboury | 341/143 |
| 6,147,631 A | * | 11/2000 | Naulik et al. | 341/122 |
| 6,175,728 B1 | * | 1/2001 | Mitama | 455/323 |
| 6,393,070 B1 | * | 5/2002 | Reber | 341/157 |

FOREIGN PATENT DOCUMENTS

JP      363094718 A   *   4/1988

OTHER PUBLICATIONS

Miyashita et al., "5 MHz Analog–to–Digital Converter With Polarity Alternating Feedback Comparator", IEEE, pp. 91–94, Dec., 1997.*

"*Continuous Time Filters*", Rolf Schaummann and Mehtnet Ali Tan, Chapter 9, pp. 371–386, from *Analogue IC Design: the current mode approach*, (1990).

"An Overview of Basic Concepts", J.C. Candy, Chapter 1, pp. 1–43, from *Delta–Sigma Data Converters Theory, Design, and Simulation*, (1997).

* cited by examiner

Primary Examiner—Young T. Tse
(74) Attorney, Agent, or Firm—Fulwider Patton Lee & Utecht, LLP; Joel D. Voelzke, Esq.

(57) ABSTRACT

A wireless receiver receives a wireless signal by inverting the polarity of an incoming waveform on every one half clock cycle of a conversion clock to produce a commutated waveform and converting said commutated waveform to a series of representative digital values using a delta-sigma modulator clocked by said conversion clock. In this way, the receiver operates over a large dynamic range and the use of automatic gain control in the front end may be eliminated.

19 Claims, 7 Drawing Sheets

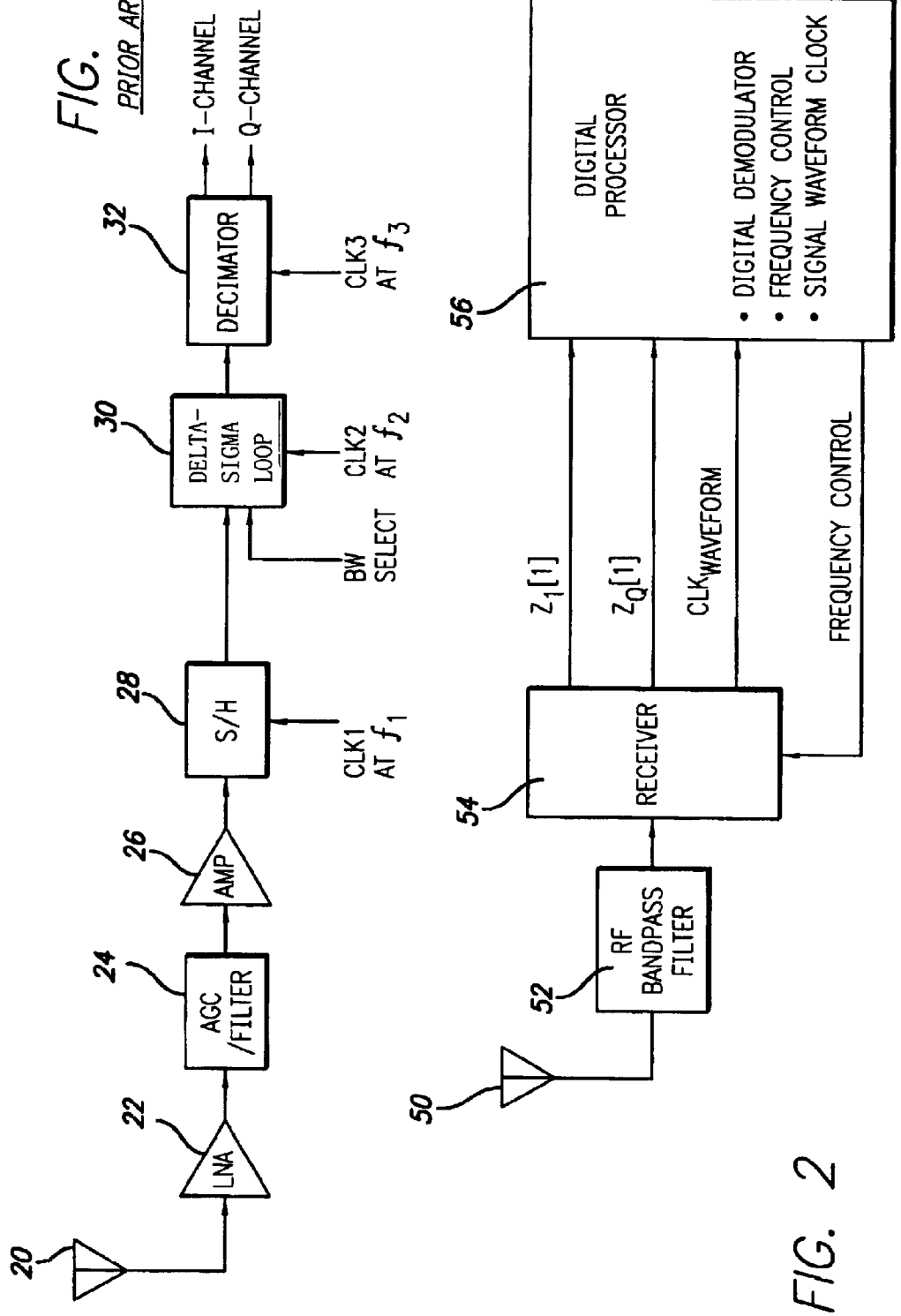

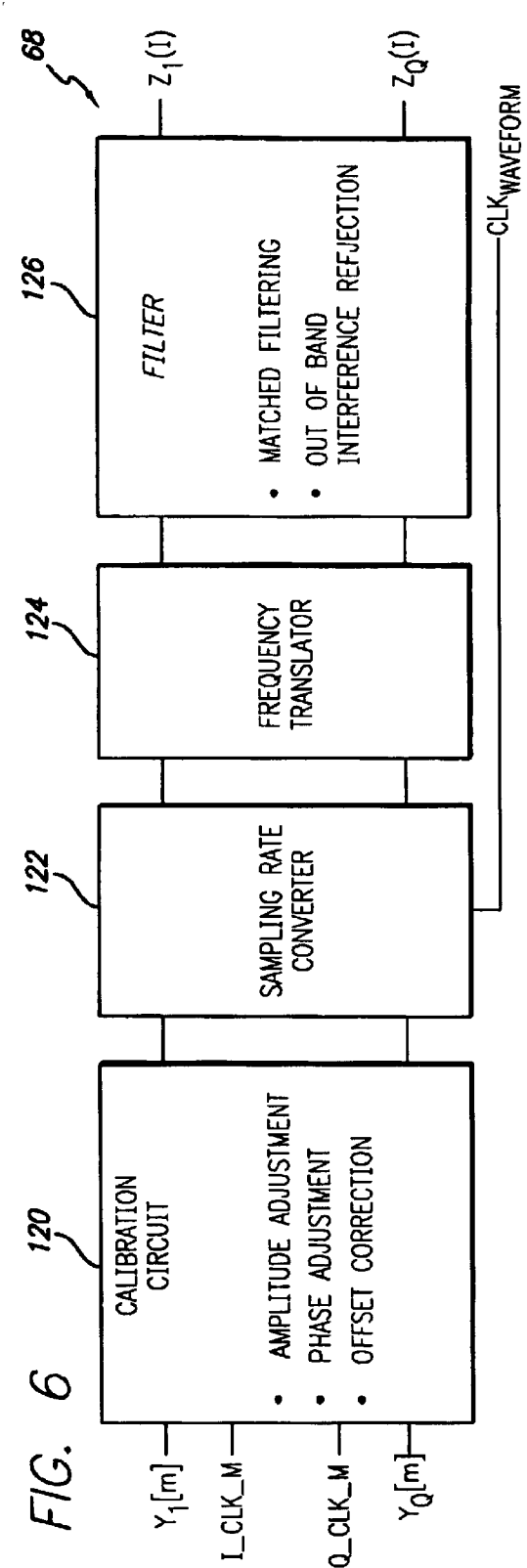
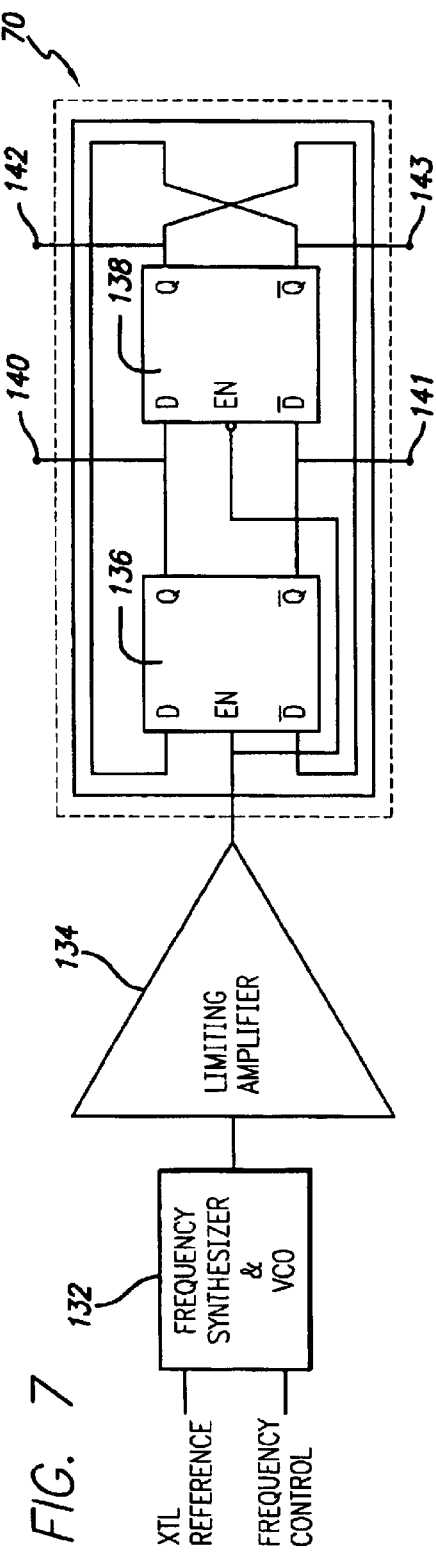

DIRECT CONVERSION DELTA-SIGMA RECEIVER

BACKGROUND OF THE INVENTION

I. Field of the Invention

This invention relates generally to wireless communication systems. More specifically, the invention relates to signal reception in a wireless communication system.

II. Description of the Related Art

Wireless systems are becoming a fundamental mode of telecommunication in modern society. In order for wireless systems to continue to penetrate into the telecommunications market, the cost of providing the service must continue to decrease and the convenience of using the service should continue to increase. In response to increasing market demand, several industry standard communication techniques have been developed based upon digital modulation schemes. For example, code division multiple access (CDMA), time division multiple access (TDMA) and frequency hopping techniques have been used to develop modern communication systems. As these systems are implemented in parallel with one another, it is often advantageous to have a receiver that is capable of communication using more than one of these standardized techniques. In order to do so, it is necessary to have a receiver that is capable of receiving signals which have been modulated according to several different modulation techniques.

Existing receivers are implemented using double conversion receiver architectures. A double conversion receiver architecture is characterized in that the received RF signal is converted to an intermediate frequency (IF) signal and the IF signal is subsequently converted to baseband. In addition, typically gain control is also applied at the IF. However, double conversion receivers have the disadvantage of utilizing a great number of circuit components, thus, increasing the cost, size and power consumption of the receiver.

A direct conversion receiver provides an alternative to the traditional double down conversion architecture. Direct conversion is characterized in that the received signal is converted directly from the radio frequency at which it is received to baseband. One such technique was disclosed by Williams in U.S. Pat. No. 5,557,642 entitled "DIRECT CONVERSION RECEIVER FOR MULTIPLE PROTOCOLS." FIG. 1 is a block diagram showing a direct conversion receiver in accordance with the teachings of Williams. An antenna 20 receives RF signals that have been digitally modulated according to a predetermined standard. The output of the antenna 20 is passed to a low noise amplifier (LNA) 22. The LNA 22 amplifies the incoming signal. The output of the LNA 22 is coupled to an automatic gain control (AGC) and filtering block 24. The automatic gain control and filtering block 24 controls the magnitude and spectral content of the received signal. For example, the automatic gain control and filtering block 24 may comprise an anti-aliasing filter in order to prevent out-of-band noise and signals from corrupting the in-band signals of interest during subsequent signal processing. In addition, the automatic gain control and filtering block 24 controls the amplitude of the signal so that it remains within predetermined signal limits of subsequent processing stages. The output of the automatic gain control and filtering block 24 is coupled to an amplifier 26 which further amplifies the signal.

The output from the amplifier 26 is input into a sample and hold circuit 28. The sample and hold circuit 28 is clocked by a first clock having a frequency $f_1$. The output of the sample and hold circuit 28 comprises a series of copies of the modulated signal centered about multiples of the clock frequency $f_1$. The output of the sample and hold circuit 28 is coupled to an oversampling delta-sigma converter 30. The delta-sigma converter 30 receives a second clock having a frequency, $f_2$, which is an integer multiple of the frequency $f_1$. In this way, the delta-sigma converter loop 30 oversamples the output signal provided by the sample and hold circuit 28; thus, after decimation filtering providing a quantized representation of the modulated signal.

The construction of the sample and hold circuit 28 requires the use of high frequency circuit elements and design techniques even when the subsampling frequency is relatively low. For example, if a 2 GHz carrier signal is subsampled with a modest 200 MHz clock, a Gaussian sampler model predicts that a root mean-squared (RMS) aperture time—during which the sample and hold circuit samples the signal—of only 6.5 picoseconds would result in introducing a conversion loss of nearly 3 dB. Increasing this aperture time to 16 picoseconds would result in dramatically increasing this conversion loss to 17.6 dB. Timing uncertainties (or jitter) tend to degrade the performance of a subsampler. Using the aforementioned example, an ideal sampler model predicts that a mere 5 picoseconds of RMS jitter limits resolution to 3.7 bits while achieving a resolution of 16 bits requires that RMS jitter be limited to 1 femtosecond.

The sample and hold circuit 28 is typically implemented using some combination of diodes, FET switches or operational amplifiers that typically only operate sufficiently linearly over a small portion of their overall functional voltage range. In addition, the use of subsampling reduces the oversampling ratio that would be achieved by sampling at the carrier frequency or higher thereby significantly reducing the dynamic range of the delta-sigma converter loop 30. For example, the resolution of a delta-sigma converter is dependent upon the oversampling ratio. First, second, third, and fourth order delta-sigma converters optimally achieve 1.5, 2.5, 3.5, and 4.5 bits of resolution per octave of oversampling ratio, respectively. For example, using 200 MHz sampling clock, the Williams' architecture sacrifices 4.98 bits of resolution (30 decibels (dB)), 8.30 bits of resolution (50 dB), and 11.63 bits of resolution (70 dB), for first, second, and third order delta-sigma converters, respectively, as compared to sampling at the carrier frequency. Recognizing that in a typical system application with a dynamic range requirement of 90 dB or greater, the dynamic range over which the input signal varies is larger than the dynamic range over which subsequent elements, such as the sample and hold circuit 28 and delta-sigma loop 30, can operate, Williams inserted the AGC and filter circuit 24 before the sample and hold circuit 28.

The inclusion of the AGC and filter circuit 24 to extend the dynamic range of a receiver is undesirable for spectrally crowded applications such as cellular communications because it makes the receiver sensitivity dependent upon signals and interference that are outside the signal channel. For example, it is possible for a strong signal in an adjacent channel to capture the receiver front end and desensitize the receiver so that a weak signal in the channel of interest is undetectable. In order to avoid this type of operation, the AGC and filter circuit 24 must be capable of rejecting the out-of-band signals before they desensitize the receiver. The resultant filter included in the AGC and filter circuit 24 is typically a tunable narrowband, bandpass filter. Because it is currently not practical to realize such a filter on a semiconductor substrate, inclusion of such a filter significantly increases the cost and complexity of the receiver. Thus, although the AGC portion and LNA portions can be implemented on a high frequency semiconductor substrate, the design requires the signal path to exit the semiconductor for filtering. In order to exit the semiconductor, the signal levels must be increased thereby increasing the size, cost and power consumption of the receiver. In addition, the filter itself is typically implemented using discrete analog components, further increasing the size and cost of the receiver. Finally, the inclusion of automatic gain control creates a DC offset error which is a function of the automatic gain control setting, making offset correction difficult to implement.

Therefore, there has been a need in the industry to develop a more efficient receiver such as one which can be implemented on a single substrate.

SUMMARY OF THE INVENTION

The invention comprises a method of receiving a wireless transmission by inverting the polarity of an incoming waveform on every one half clock cycle of a conversion clock to produce a commutated waveform and by converting the commutated waveform to a series of representative digital values using a delta-sigma modulator clocked by the conversion clock. In one embodiment, the incoming waveform is centered about a radio frequency and carries a modulated signal, the conversion clock has a frequency approximately equal to the radio frequency, and the series of representative digital values are representative of the modulated signal. In another embodiment, the series of representative digital values are digitally filtered according to programmable filter characteristics wherein the programmable filter characteristics are selected based upon a type of modulation of the modulated signal.

In one embodiment, inversion is performed by producing an inverted signal representation of the incoming waveform, producing a non-inverted signal representation of the incoming waveform, coupling the inverted signal representation to a first input port of a switch, coupling the non-inverted signal representation to a second input port of the switch, and coupling the conversion clock to a control port of the switch, wherein the incoming waveform is received over an antenna and wherein an amplitude of the incoming waveform is in fixed proportion to an amplitude of a signal strength received by the antenna.

In one embodiment, the invention comprises filtering an antenna signal to prevent aliasing out-of-band signal and noise power into a desired signal band, the step of filtering producing the incoming waveform, and a frequency of the conversion clock is selected from a range of frequencies passed in the step of filtering.

In another embodiment, the invention comprises a continuous time commutator configured to be coupled to a digital conversion clock and configured to invert a polarity of an incoming signal applied to an input port on every half clock cycle of the digital conversion clock and to produce a commutated signal at an output port. And the invention comprises a delta-sigma modulator having a clock input port coupled to the digital conversion clock, having a signal input port coupled to the output port of the continuous time commutator and having an output port configured to produce a series of digital values representative of a modulation waveform carried by the incoming signal.

The continuous time commutator may comprise a complementary amplifier configured to receive the incoming signal and to produce an inverted version of the incoming signal at an inverted output port and to produce a non-inverted version of the incoming signal at a non-inverted output port, and a switch having a first input port coupled to the inverted output port, having a second input port coupled to the non-inverted output port and having a control port coupled to the digital conversion clock. The delta-sigma modulator may comprise a loop amplifier having a first input port coupled to the output port of the continuous time modulator, having a second input, and having an output port, a continuous time loop filter coupled to the output port of the loop amplifier and having an output port, an edge-triggered comparator coupled to the output port of continuous time loop filter, having a clock input coupled to the digital conversion clock and having an output port, and a one-bit digital to analog converter having an input port coupled to the output port of the edge-triggered comparator and having an output port coupled to the second input of the loop amplifier.

The invention may further comprise a programmable digital filter having an input port coupled to the output of the delta-sigma modulator, the programmable digital filter configured to filter the series of digital values according a filter characteristics selected based upon a type of modulation of the modulation waveform. In yet another embodiment, the invention comprises an antenna coupled to the continuous time commutator so as to receive the incoming signal, wherein an amplitude of the incoming signal is in fixed proportion to an amplitude of a signal strength received by the antenna. In yet still another embodiment, the invention comprises a filter configured to receive an antenna signal and configured to prevent aliasing of out-of-band signal and noise power into a desired signal band, the filter coupled to the input port of the continuous time commutator, wherein a frequency of the conversion clock is selected from a range of frequencies passed by the filter.

In a third embodiment, the invention comprises a linearizing operational amplifier in a non-inverting unity follower configuration, configured to receive an incoming waveform, a transistor network having a first input coupled to an output of the linearizing operational amplifier and having a second input coupled to the incoming waveform, the linearizing operational amplifier and the first complementary transistor network configured to produce a pair of complementary currents that are linearly related to an input voltage level of the incoming waveform a first current source coupled to the transistor network and configured to provide a fixed current through the first transistor network, a commutator network coupled to a clock signal and coupled to the pair of complementary currents that are linearly related to the input voltage level of the incoming waveform, a second current source configured to produce a fixed current, and a switching network coupled to the second current source, having complementary input ports configured to be coupled to logic values and configured to produce complementary switched currents, wherein the complementary switched currents are coupled to the commutator network in order to control together complementary voltage outputs produced by the circuit.

BRIEF DESCRIPTION OF THE DRAWINGS

The features, objectives, and advantages of the invention will become more apparent from the detailed description set forth below when taken in conjunction with the drawings wherein like parts are identified with like reference numerals throughout and wherein:

FIG. 1 is a block diagram showing a direct conversion receiver in accordance with the teachings of the prior art.

FIG. 2 is a block diagram showing one embodiment of a direct conversion receiver according to the invention.

FIG. 6 is a block diagram showing one embodiment of a processor for use with the invention.

FIG. 7 is a block diagram showing one embodiment of a clock generator.

DETAILED DESCRIPTION OF THE INVENTION

Figure 3:
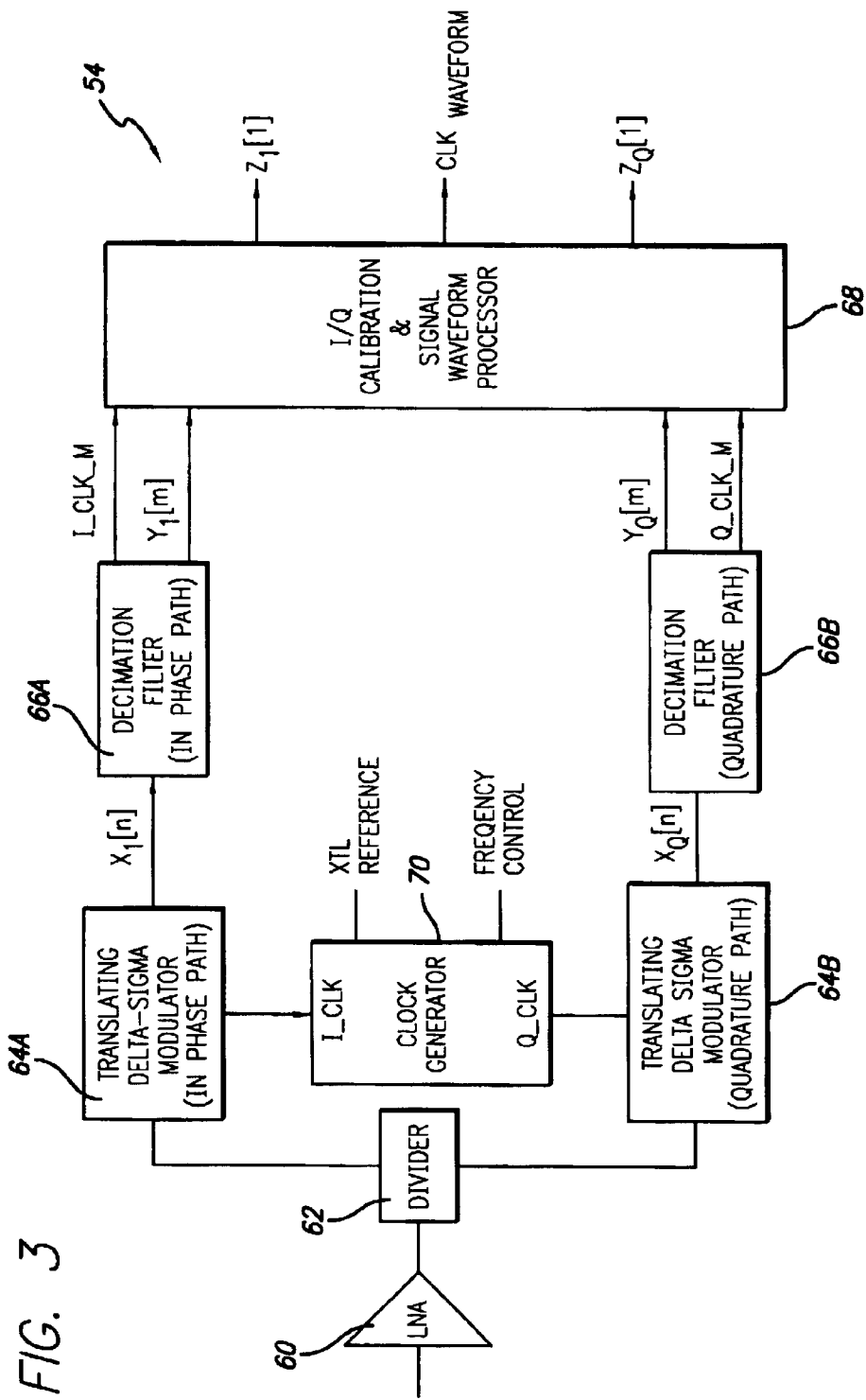
FIG. 3 is a block diagram showing an exemplifying embodiment of a core receiver structure.

The invention seeks to overcome limitations of the prior art by providing enhanced performance with more elegant circuit structures. The direct conversion architectures shown below operate over a wider dynamic range than prior art circuits, thus, decreasing the need for the inclusion of automatic gain control circuits and off-substrate filtering. For this reason, the architecture can be more readily implemented on a single semiconductor substrate in comparison with the prior art.

FIG. 2 is a block diagram showing an application of the direct conversion receiver according to the invention. High frequency signals are received through an antenna 50. For example, in a personal communication system (PCS) application, the high frequency signal is a digitally modulated RF signal centered about a carrier frequency of approximately 2 gigahertz (GHz). A band pass filter 52 is coupled to the antenna 50 and is included to prevent aliasing out-of-band signal and noise power into the signal band. For example, the filter 52 functions to prevent aliasing of energy received at one half the carrier frequency. The out-of-band rejection requirements on the band pass filter 52 are significantly reduced compared to the prior art. In the preferred embodiment, the filter 52 does not attempt to reject adjacent channel interference and is not required to be tunable.

A receiver 54 is coupled to the filter 52 and receives the RF input signal. The receiver 54 is a direct conversion receiver according to the invention which produces a digital representation of the modulation on the RF input signal. The operation of the receiver 54 is explained more fully below. A digital processor 56 is coupled to the receivers 54 and provides digital demodulation of the signal waveform, frequency control and signal waveform clocks as well as other digital signal processing functions.

FIG. 3 is a block diagram showing an exemplary embodiment of the receiver 54. At the input of the receiver 54 is a low noise amplifier (LNA) 60. The low noise amplifier 60 amplifies the incoming signal while avoiding the addition of excessive noise and distortion. The output of the LNA 60 is coupled to a divider 62. The divider 62 is used to couple the signal at the output of the LNA 60 to the input of a translating delta-sigma modulator 64A within the in-phase path and to the input of a translating delta-sigma modulator 64B within a quadrature path. The divider 62 can be implemented using a variety of active elements, passive elements or both. The divider 62 can be implemented as a splitter or the output of the low noise amplifier can be coupled directly to both of the translating delta-sigma modulators 64.

In many applications, a digitally modulated RF signal can be demodulated by decomposition into in-phase and quadrature components. Thus, in FIG. 3, the in-phase and quadrature components of the signal are separately received using an in-phase signal path and a quadrature signal path, respectively. However, the teachings of the invention may be directly applied to receivers which employ a single receiver path. In FIG. 3, the implementation of the in-phase and quadrature paths are alike and, thus, an understanding of one path leads directly to an understanding of the other.

The translating delta-sigma modulators 64 digitize the modulated RF signal. In one embodiment, the digital data output of each of the translating delta-sigma modulators 64 is a one-bit data stream at the sample rate, characteristic of typical delta-sigma modulators as explained more fully below.

The outputs of the translating delta-sigma modulator 64A and the translating delta-sigma modulator 64B are coupled to the input of a decimation filter for the in-phase path 66A and a decimation filter for the quadrature path 66B, respectively. The decimation filters 66 perform digital filtering and decimation to produce digital words at the rate of a clock, CLK_M. In the preferred embodiment, the decimation filters 66 have a low pass frequency response which is designed to filter out noise and signals outside the bandwidth of interest.

The outputs from the decimation filters 66 are coupled to an I/Q calibration and signal waveform processor 68. The processor 68 produces L-bit representations of the I and Q information content of the signal of interest that are applied to the digital demodulator of the digital processor 56. In the preferred embodiment, the processor 68 implements complex digital filtering which selects the signal or signals that are of interest and suppresses out-of-band signals. Specifically, the processor 68 develops a high resolution representation of the I and Q components of the signal or signals of interest. In one embodiment, the processor 68 synchronizes its data output with a waveform clock, $CLK_{wf}$. In addition, the processor 68 comprises a filter matched to the incoming signal waveform.

Figure 4:
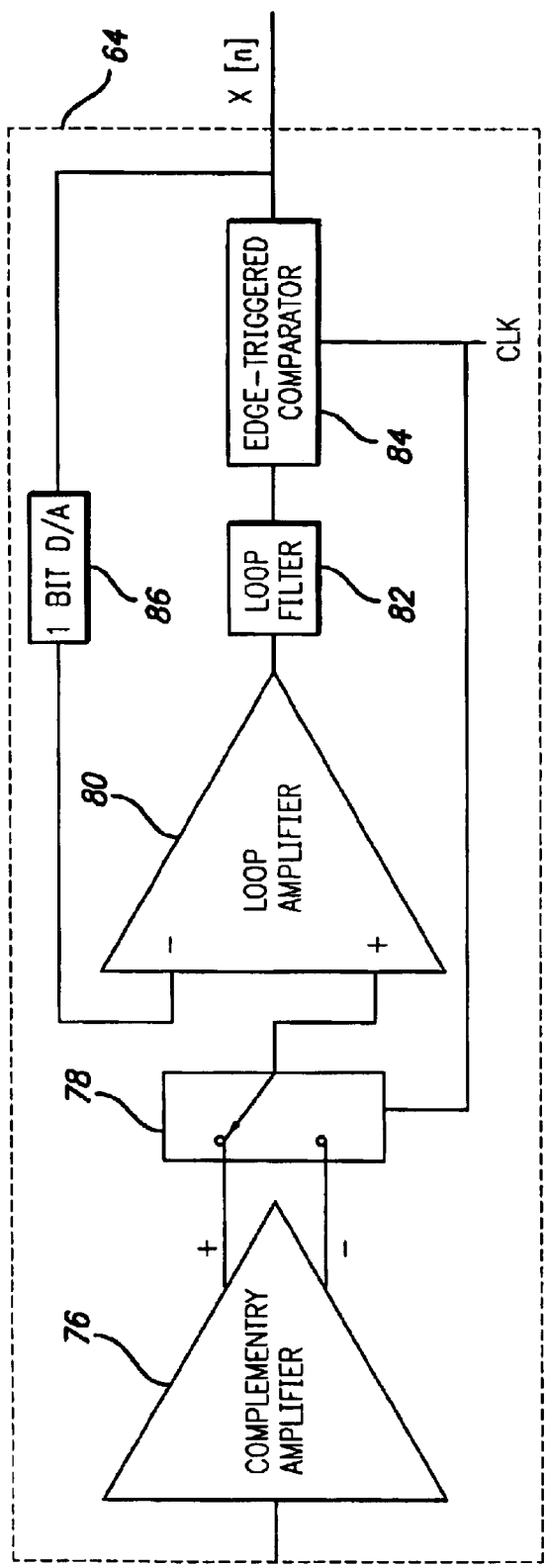
FIG. 4 is a block diagram showing an exemplifying embodiment of a translating delta-sigma modulator.

FIG. 4 is a block diagram showing an exemplifying embodiment of the translating delta-sigma modulator 64. A complementary amplifier 76 receives the digitally modulated RF signal centered about the carrier frequency. At a non-inverting output, the complementary amplifier 76 produces a voltage that is G times the voltage at the input to the complementary amplifier 76. At an inverting output, the complementary amplifier 76 produces a voltage that is −G times the voltage at the input to the complementary amplifier 76. The inverting and non-inverting outputs of the complementary amplifier 76 are coupled to two input ports of a switch 78. The control port of the switch 78 determines which input port is coupled to the output port and is driven by the conversion clock, CLK, such that the output port of the switch 78 is alternately coupled to the inverting and non-inverting outputs of the complementary amplifier 76.

Together, the complementary amplifier 76 and the switch 78 perform the functions of a commutator which inverts the polarity of the digitally modulated RF signal on every half cycle of the conversion clock, CLK. If the frequency of the conversion clock CLK is chosen to be approximately equal to the carrier frequency of the digitally modulated RF signal, effectively, the commutator translates the modulation of the carrier signal down to D.C. centered or frequency offset baseband. In addition to the low frequency signal components, high frequency signal components are also generated by the commutator. However, the high frequency components are attenuated by the delta-sigma modulator and further filtering. In one embodiment, the frequency of the conversion clock CLK is programmable to permit the translation of a variety of waveforms over a range of center frequencies.

The commutator comprised of the complementary amplifier 76 and the switch 78 is not a conventional downconverter. The mathematical paradigm for a conventional downconverter is multiplication by a sinusoidal signal. Practical implementations of conventional downconverters (such as circuits employing using diode rings or Gilbert multiplier circuits) are incapable of realizing this mathematical paradigm without introduction of distortion and feedthrough effects that result in the creation of undesired spurious signals.

In contrast, the mathematical paradigm of the commutator is that of alternately multiplying the input signal by +1 and −1 on opposite half cycles of a clock signal. Practical implementations of the commutator employing a fast switch behave more closely to this mathematical paradigm, thus avoiding the production of spurious signal energies in comparison to a conventional down converter.

The output of the switch 78 is coupled to the input of the core delta-sigma modulator. The core delta-sigma modulator is comprised of a loop amplifier 80, a loop filter 82, an edge-triggered comparator 84 and a one-bit digital-to-analog (D/A) converter 86. In the preferred embodiment, the core delta-sigma modulator is operated at the same frequency as the commutator. Use of a conversion clock operating at or near the carrier frequency provides a significant oversampling ratio in typical embodiments and, hence, leads to high resolution, high dynamic range performance according to well-known principles of delta-sigma conversion.

The output of the switch 78 is coupled to the non-inverting input of the loop amplifier 80. The output of the loop amplifier 80 is the difference between the voltage coupled to its non-inverting input port and its inverting input port times a voltage gain, $A_v$, where the voltage gain is typically a large positive constant. The output of the loop amplifier 80 is coupled to the input of the loop filter 82. The loop filter 82 is typically an analog low pass filter but can be embodied in other forms. In one embodiment, the loop amplifier 80 and loop filter 82 act as an integrator. The output of the loop filter 82 is coupled to the input of the edge triggered comparator 84. The clock input of the comparator 84 is coupled to the conversion clock, CLK. When the voltage value at the signal input to the edge-triggered comparator 84 is greater than a predetermined threshold value at the time the conversion clock transitions, the output is a logic value 1. When the voltage value at the signal input to the edge-triggered comparator 84 is less than the predetermined threshold value at the time the conversion clock transitions, the output is a logic value 0. The output of the edge-triggered comparator 84 is coupled to the input of the one-bit digital-to-analog converter 86. The one-bit digital-to-analog converter 86 produces one of two analog levels at its output depending upon the digital logic value applied to its input. The output of the one-bit digital-to-analog converter 86 is coupled to the inverting input of the loop amplifier 80.

The core delta-sigma modulator shown in FIG. 4 and described above is a standard, one-bit digital-sigma modulator. However, a variety of delta-sigma modulators and delta-sigma modulation techniques can be combined with the teachings of this invention. The design of delta-sigma modulators has been studied extensively. For example, additional information concerning delta-sigma modulators is found in *Delta-Sigma Data Converters: Theory, Design, and Simulation* by Steven R. Norsworthy, published by IEEE Press in 1996.

Because MOS technology lends itself inherently to implementing discrete-time filters based on capacitor ratios, prior art systems use switched-capacitor technology to implement delta-sigma modulators. Inherently, switched-capacitor filters cause aliasing and, hence, additional interference to the system. In addition, because MOS switched-capacitor circuits must be operated at a much lower oversampling ratio, they do not have as much resolution for any given order of the delta-sigma modulator in comparison with the invention. In order to gain resolution, prior art systems typically use higher order loop filters which are only conditionally stable. As the order of the delta-sigma modulator is increased, the implementation of a stable loop that is capable of operating at high clock frequencies becomes more difficult.

In contrast, in one embodiment, the invention comprises a continuous-time filter for the loop filter 82. As noted above, typically, the delta-sigma modulator 64 according to the invention operates at or near the carrier frequency. Due to the use of a high frequency clock, the use of higher order filtering is not necessary in order to achieve a high degree of resolution. Therefore, the use of a lower order, continuous-time filter is practical in conjunction with the invention. Continuous-time filters are less difficult and bulky to implement than switched-capacitor filters. Furthermore, continuous-time filters can be operated at much higher frequencies than switched-capacitor circuits in a given semi-conductor technology. Finally, the use of a continuous-time filter has the added advantage of eliminating aliasing that is potentially produced by switched-capacitor filters.

The output of the edge-triggered comparator 84 is coupled to the decimation filter 66. The decimation filter 66 converts the stream of 1-bit digital words into a stream of N-bit digital words that comprise conventional binary representations of the signals. In addition, the decimation filter 66 produces a clock signal, CLK_M, which indicates the rate at which the binary representations are created and is used to transfer the filtered output. The rate at which the words produced by the decimation filter 66 is determined by the oversampling ratio. For an oversampling ratio of M, the output clock rate is 1/M times the rate of the incoming data, or alternatively stated, for the embodiment of FIG. 4, the output clock rate is equal to $f_{RX}/M$ where $f_{RX}$ is the rate of the conversion clock, CLK.

The decimator filter 66 attenuates unwanted signals and noise sources outside of the bandwidth of interest while preserving the fidelity of the signals of interest. The desired filter characteristics of the decimation filter 66 are selected on the basis of the characteristics of the receive signal as well as the conversion clock rate, $f_{RX}$. In one embodiment, the decimation filter 66 has a programmable characteristic which can be modified to accommodate a variety of different waveforms. Typically, the decimation filter 66 is implemented with a finite impulse response (FIR) filter whose characteristics are modified by changing the value of the filter coefficients. The value of the filter coefficients of a digital filter can be readily changed via software making such modifications practical.

An understanding of the desired characteristics of the decimation filter can be understood with reference to FIG.

Figure 5A:
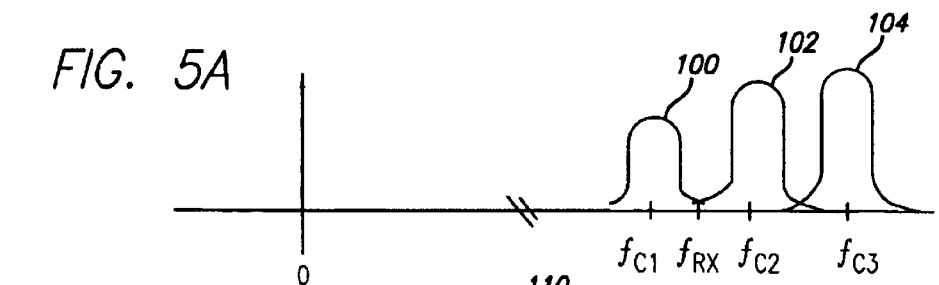
FIGS. 5A–5E are spectral plots used to illustrate operation of several embodiments of the invention.

5A where the vertical axis represents energy such as in units of decibels and the horizontal axis represents frequency such as in units of gigahertz. FIG. 5A is a spectral plot showing received signal energies 100, 102 and 104 centered about three different carrier frequencies, $f_{c1}$, $f_{c2}$ and $f_{c3}$ respectively. In one embodiment, we shall assume that signal energies 100, 102 and 104 each comprise an incoming waveform comprising a digitally modulated RF signal of interest. We shall also assume that the conversion clock, CLK, operates at a frequency $f_{RX}$ which is between frequencies $f_{c1}$ and $f_{c2}$. In FIG. 5A, the horizontal axis has been segmented so that more of the signal energy can be shown.

Figure 5B:
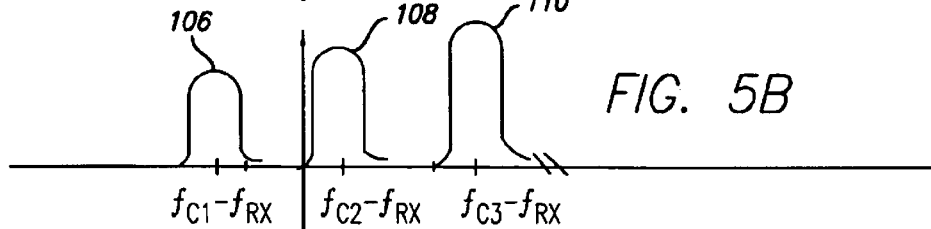

FIG. 5B represents the corresponding output of the switch 78 (excluding noise) of FIG. 4 when the spectrum shown in FIG. 5A is applied thereto. For example, in a typical embodiment, the frequency $f_{RX}$ is equal to 1851.4 MHz and the frequencies $f_{c1}$, $f_{c2}$ and $f_{c3}$ are 1851, 1851.6 and 1852.2 MHz, respectively. Each of the signal energies 100, 102 and 104 have a bandwidth of approximately 100 kHz. Thus, in FIG. 5B, the signal energies 106, 108 and 110 correspond to signal energies 100, 102 and 104, respectively, and are centered about −400 kHz, 200 kHz and 800 kHz, respectively. Note that the signal energy 106 has been translated to the negative portion of the frequency axis.

Figure 5C:
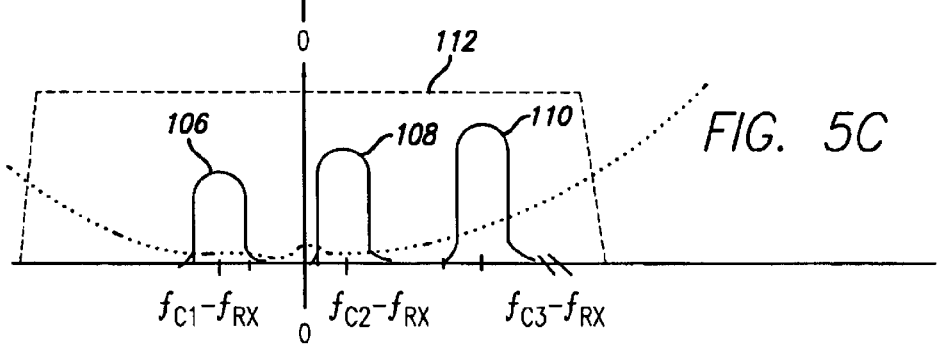

A dashed line 112 of FIG. 5C represents the transfer curve of the decimation filter 66 in one embodiment. In this embodiment, the low pass decimation filter 66 passes all three signal energies 106, 108 and 110. (For example, each of the signal energies 106, 108 and 110 could be produced by a different transmitting unit.) In this example, none of the signal energies are centered about D.C. In this way, the effects of any D.C. offset in the system and the 1/f noise (denoted by the increase in the spectral noise density curve 113 around zero frequency) can be reduced by follow-on filtering, for example, matched filtering. The spectral noise density curve 113 of FIG. 5C shows that the spectral noise density level increases (primarily due to quantization noise of the delta-sigma converter) as the frequency increases, except for 1/f increase near zero frequency. As a result the noise level within the bandwidth of signal energy 110 is greater than that for signal energies 106 or 108. In this embodiment, the decimation filter 66 is implemented with low pass filtering and equivalent bandpass filtering is implemented in the following matched filter.

Figure 5D:
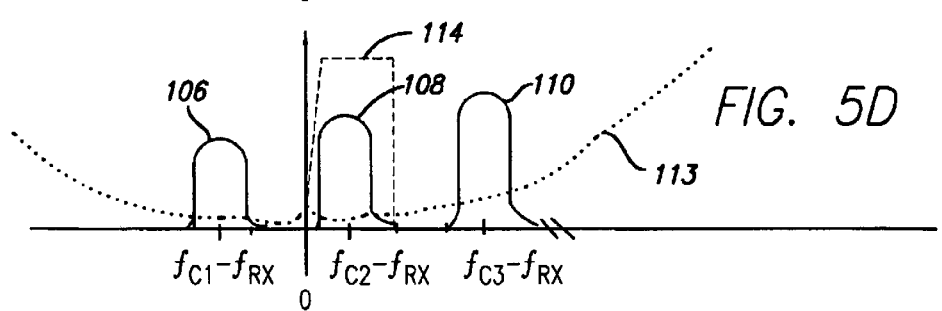

In an alternative embodiment, the decimation filter 66 is more frequency selective so that only one of the signal energies (such as might be produced by a single transmitting unit) is passed without substantial attenuation. For example, in FIG. 5D, the dashed line 114 shows such a decimation filter 66 transfer characteristic. As can be seen from FIG. 5D, in the alternative embodiment, only the signal energy 108 is efficiently passed through the decimation filter 66.

Figure 5E:
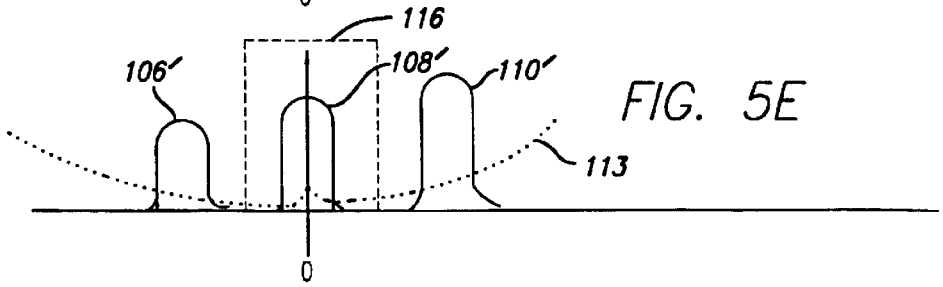

In yet another embodiment, the down-converted waveform is centered about D.C.; i.e. has zero frequency offset, as shown in FIG. 5E. Conversion to D.C. centered baseband has the benefit of achieving higher resolution for a given clock rate which can be a particular benefit for wideband signals where the effects of quantization noise should be minimized. The effects of 1/f noise are less pronounced in a wide band system and can be filtered with a notch filter at zero frequency without significantly degrading the performance. A dashed line 116 of FIG. 5E represents the transfer curve of the decimation filter 66 in one such embodiment. More information concerning the design of decimation filters can be found in *Multi-Rate Digital Signal Processing*, Prentice-Hall Inc., Englewood Cliffs, N.J., 1983 by R. E. Crochiere and L. R. Rabiner.

It is advantageous for the receiver to operate in accordance with more than one communication protocol. For example, the receiver can be capable of operation in a narrow band time division multiple access (TDMA) system such as Global System for Mobile Communications (GSM) or a wideband code division multiple access (CDMA) system such as defined in the Telephone Industry Association, Electronic Industry Association (TIA/EIA) interim standard entitled "Mobile Station—Base Station Capability Standard for Dual-Mode Wideband Spread Spectrum Cellular System," TIA/EIA/IS-95. In such an embodiment, the decimation filter 66 can take on a narrow band transfer characteristic, such as the one shown by dashed line 114, during TDMA operation and can take on a wide band transfer characteristic, such as the one shown by the dashed line 112, during CDMA operation, according to well known principles of digital filtering and signal reception. Alternatively, a single wideband, low-pass decimation filter could be utilized and the programmable bandwidth implemented in the following matched filtering.

The output of the decimation filter 66 is the input into the I/Q calibration and signal waveform processor 68. FIG. 6 is a block diagram showing one embodiment of the processor 68. The clock and data output of the decimation filters 66A and 66B are coupled to a calibration circuit 120. The calibration circuit 120 adjusts the relative gain and phase so that the in-phase and quadrature signal paths are balanced with respect to each other. In order to avoid introduction of distortion into the signals, it is important that the relative gain and phase of the in-phase and quadrature signal paths is the same. One advantage of a digital signal processing architecture is that these parameters can be controlled in the digital circuit elements more easily than in analog circuit elements. Typically, unbalances originate from the differences in gain between the I and Q channels and errors in the relative 90° phase shift between the I and Q channels. Additionally, any differences in the DC offsets can be calibrated out. Additional information concerning accomplishment of calibration can be found in U.S. Pat. No. 5,422,889 entitled "OFFSET CORRECTION CIRCUIT," and in U.S. Pat. No. 5,604,929 entitled "SYSTEM FOR CORRECTING QUADRATURE GAIN IN-PHASE ERROR IN A DIRECT CONVERSION SINGLE-SIDE BAND RECEIVER INDEPENDENT OF THE CHARACTERISTICS OF THE MODULATED SIGNAL."

The output of the calibration circuit 120 is coupled to the input of a sampling rate converter 122. The sampling rate converter 122 converts and synchronizes the data rate of the signal to the rate of an external clock, $CLK_{waveform}$. In one embodiment, this function is accomplished with a linear or higher order interpolation method such as the one described in "Advanced Digital Signal Processing" by J. G. Proakis, et al., and McMillian Publishing Co.

The output of the sampling rate converter 122 is coupled to the input of a frequency translator 124. In one embodiment, the frequency translator 124 is used to translate the center frequency of the signal of interest to D.C. centered baseband. The frequency translator 124 multiplies the signal at the output of the sampling rate converter 122 with a digital representation of a sinusoidal signal having a frequency equal to the center of the frequency of signal of interest. The advantage of frequency translation is that it allows the matched filter for the signal to be implemented as a low pass filter and provides the baseband I and Q inputs required for the digital demodulator input. For the situation shown in FIG. 5E where there is only one signal of interest and it has zero offset, the frequency translator 124 is not used.

The output of the frequency translator 124 is coupled to a low pass filter 126 which can operate as a signal matched filter. The low pass filter 126 is also used to reject interference outside the bandwidth of interest. The output of the low pass filter 126 provides a digital I and Q signal input to the digital demodulator that is synchronized with the digital demodulator clock—$CLK_{Waveform}$.

FIG. 7 is a block diagram showing one embodiment of the clock generator 70. In the embodiment of FIG. 7, a frequency synthesizer 132 produces an analog waveform at twice the rate of the conversion clock, CLK. The output of the frequency synthesizer 132 is coupled to the input of a limiting amplifier 134. In this embodiment, the positive going zero crossing of the signal output by the frequency synthesizer 132 is compared to a threshold by the limiting amplifier 134. When the threshold is chosen appropriately, the limiting amplifier 134 produces a waveform with digital logic values at the same frequency as that of the output from the frequency synthesizer 132 and having a 50% duty cycle (i.e., the duration of the logic "1" pulse is the same as the duration of the logic "0" pulse).

The limiting amplifier 134 drives a master slave flip-flop 135 comprising a master latch 136 and a slave latch 138. The master-slave flip-flop 135 is configured in a divide-by-two configuration. In this configuration, a Q output 140 and a $\overline{Q}$ output 141 of the flip-flop 136 are connected to the D and $\overline{D}$ inputs of the flip-flop 138, respectively, and a Q output 142 and a $\overline{Q}$ output 143 of the flip-flop 138 are connected to the D and $\overline{D}$ inputs of the flip-flop 136, respectively. When the master-slave flip-flop is connected in this manner, the four latch outputs 140, 141, 142 and 143, have clock phases of 0°, 90°, 180°, and 270°, with respect to one another. Two of these outputs (for example, output 140 and output 142) can be used as I_CLK and Q_CLK, respectively. Although the implementation of FIG. 7 is included explicitly herein for illustration purposes, a variety of other means (such as a ring oscillator) can be used to generated a clock signal according to the invention.

Many modem delta-sigma converters are currently available that are implemented in silicon metal oxide semiconductor (MOS) technology. Typically such designs use switched capacitor techniques to sample the incoming signal for conversion. However, circuits capable of processing high frequency input signals, such as those formed from silicon bipolar, silicon germanium (SiGe), or gallium arsenide (GaAs) technologies, can use current steering architectures in order to increase system efficiencies.

Figure 8:
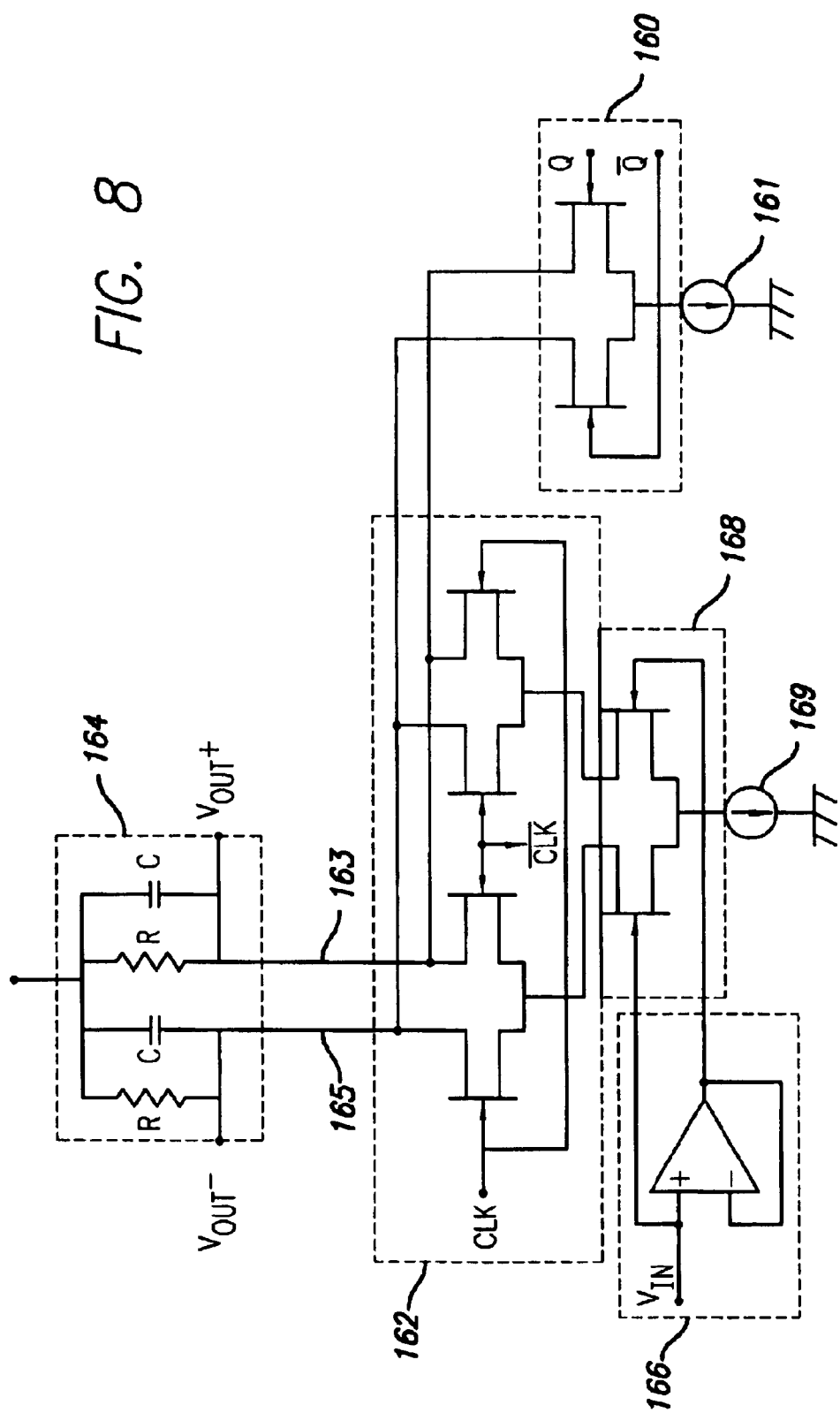
FIG. 8 is a schematic diagram showing an exemplifying circuit structure which performs the functions of the commutator, loop integrator, loop filter and digital-to-analog converter.

FIG. 8 is a schematic diagram showing an exemplifying circuit structure which performs the functions of the commutator (such as the complementary amplifier 76 and the switch 78), loop amplifier 80, loop filter 82 and digital-to-analog converter 86 shown in FIG. 4. The circuit uses a current-steering approach, thus allowing the combination of multiple functions into a single current-steering tree. The circuit can be implemented using silicon bipolar, SiGe, GaAs or other technologies.

The digital-to-analog (D/A) converter function is implemented by switching network 160. The switching network 160 is driven by logic values Q and Q-bar such as those produced by the edge-triggered comparator 84. When Q is a logic value low (which presumes that Q-bar is a logic value high), all of the current produced by a current source 161 is switched through a circuit branch 165. When Q is a logic value high (which presumes that Q-bar is a logic value low), all of the current produced by the current source 161 is switched through a circuit branch 163. Operated in this fashion, a logic value low in Q tends to drive $V_{out}+$ high and $V_{out}-$ low wherein $V_{out}+$ high and $V_{out}-$ are the complementary voltage output of the circuit shown in FIG. 8. Alternatively, a logic value high in Q tends to drive $V_{out}+$ low and $V_{out}-$ high. This behavior is similar to that expected if a logic value (such as that produced by edge-triggered comparator 84) were coupled into a conventional digital-to-analog converter (such as the 1-bit D/A 86) and the output of the digital-to-analog converter were, in turn, coupled into the inverting input of a conventional differential amplifier (such as the loop amplifier 80).

An input voltage $V_{in}$ is coupled to a linearizing operational amplifier 166 as well as to a transistor network 168. The output of the linearizing operational amplifier 166 is also coupled to the transistor network 168. The transistor network 168 converts $V_{in}$ and the output of the linearizing operational amplifier 166 into currents. In this way, the current produced by a current source 169 is directed by the transistor network 168 to produce a pair of complementary currents that are linearly related to $V_{in}$. Together, the linearizing operational amplifier 166 and the transistor network 168 perform a function similar to the complementary amplifier 76.

In the preferred embodiment, an input stage within the linearizing operational amplifier 166 replicates the input structure formed by the combination of the transistor network 168 and a current source 169. The input stage within the linearizing operational amplifier 166 further comprises pull-up devices with a linear current-voltage characteristic (such as a resistor). In addition, the linearizing operational amplifier 166 has a large overall open-loop gain. In this way, a pair of complementary currents that are linearly related to the input voltage are created.

In the circuit shown in FIG. 8, the function the commutator is performed by a commutating network 162, the linearizing operational amplifier 166 and the transistor network 168. The commutator network 162 determines how the currents produced by the transistor network 168 are directed through the circuit branches 163 and 165. The input terminals are driven by complementary conversion clock signals, CLK and CLK-bar, such as those produced by the clock generator 70. When CLK is a logic value high (which presumes that CLK-bar is a logic value low), the currents produced by the transistor network 168 are directed in such a way that an incremental increase in $V_{in}$ results in an incremental increase in the current through circuit branch 165 and an incremental decrease in the current through circuit branch 163. Alternatively, when CLK is a logic value low (which presumes that CLK-bar is a logic value high), the currents produced by the transistor network 168 are directed in such a way that an incremental increase in $V_{in}$ results in an incremental decrease in the current through circuit branch 165 and an incremental increase in the current through circuit branch 163. Operated in this fashion, an incremental increase in $V_{in}$ when CLK is a logic value high results in a proportional incremental increase in $V_{out}+$ and a equal incremental decrease in $V_{out}-$ while the same incremental increase in $V_{in}$ when CLK is a logic value low results in a proportional incremental decrease in $V_{out}+$ and an equal incremental increase in $V_{out}-$. This type of operation is similar to that expected if $V_{in}$ were coupled into the input of a commutator (such consisting of the complementary amplifier 76 and switch 78 as previously described) and the output of the commutator were coupled into the non-inverting input of a differential amplifier (such as the loop amplifier 80).

In the preferred embodiment, the function of the loop filter is performed by a lowpass filter network 164. A simple resistor and capacitor network is connected to each of the circuit branches 163 and 165. The lowpass filter network 164 has two functions. First, it converts the current flowing through circuit branches 163 and 165 into voltages $V_{out}+$ and $V_{out}-$, which when integrated into a system provides a complementary signal to a comparator such as the edge-triggered comparator 84. Information concerning Complementary approaches to comparator designs that tend to minimize variations in threshold voltage due to distortion can be found in U.S. Pat. No. 5,563,598 entitled "DIFFERENTIAL COMPARATOR CIRCUIT". Second, the lowpass filter network 164 suppresses high frequency signals. For a particular circuit configuration, the value of the resistor determines the equivalent loop amplifier gain. The product of value of the resistor and the capacitor determines the cutoff frequency of the resistor-capacitor network 164. These values may be chosen in accordance with widely-known teachings in current-mode design principles such as found in *Analogue IC Design:. The Current-Mode Approach*, Peter Peregrinus Ltd., United Kingdom, 1990, edited by C. Toumazou, F. J. Lidgey, and D. G. Haigh.

The composite circuit shown in FIG. 8 has several advantageous features. By integrating multiple functions into one circuit, the delay introduced by the circuit is reduced in comparison to the inherent hardware delay introduced by the use of separate components. The decreased delay introduced by the composite circuit increases the phase margin and stability of the delta-sigma modulator and increases the frequencies at which the delta-sigma modulator can be operated. In addition, the composite design is compact and power efficient, decreasing the size cost, power consumption, size and weight of implementation of these functions.

Figure 9:
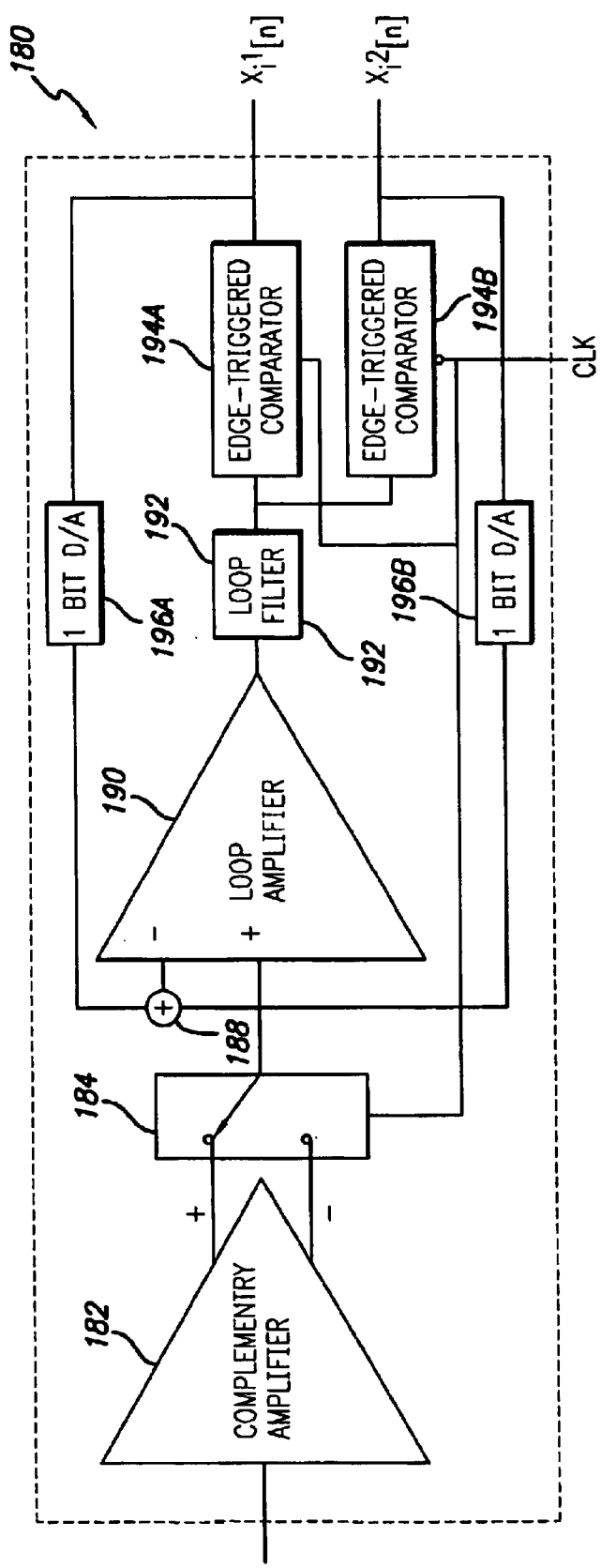
FIG. 9 is a block diagram showing an alternative embodiment of the translating delta-sigma modulator that employs double-sampling.

Additional techniques can be used to further increase the achievable oversampling rate of delta-sigma converters from a clock with a prescribed frequency. FIG. 9 is a block diagram showing an alternative embodiment of the translating delta-sigma modulator that employs double-sampling (i.e., samples on both edges of a clock signal). The delta-sigma modulator 180 operates under some of the same principles as the single sampled architecture shown in FIG. 4 while doubling the sample rate, thereby relaxing the speed requirements for circuitry by a factor of two. The delta-sigma modulator 180 can be used as within the architecture shown in FIG. 3 as the transmitting delta-sigma modulators 64A and 64B.

A complementary amplifier 182 receives the digitally modulated RF signal centered about the carrier frequency. At a non-inverting output, the complementary amplifier 182 produces a voltage that is G times the voltage at the input to the complementary amplifier 182. At an inverting output, the complementary amplifier 182 produces a voltage that is −G times the voltage at the input to the complementary amplifier 182. The inverting and non-inverting outputs of the complementary amplifier 182 are coupled to two input ports of a switch 184. The control port of the switch 184 determines which input port is coupled to the output port and is driven by the conversion clock, CLK, such that the output port of the switch 184 is alternately coupled to the inverting and non-inverting outputs of the complementary amplifier 182.

Together, the complementary amplifier 182 and the switch 184 perform the functions of a commutator as explained more fully above. The output of the switch 184 is coupled to the input of the core double-sampling delta-sigma modulator. The core double-sampling delta-sigma modulator is comprised of a combiner 188, a loop amplifier 190, a loop filter 192, an even-phase edge-triggered comparator 194A, an odd-phase edge-triggered comparator 194B, an even-phase digital-to-analog converter 196A and an odd-phase digital-to-analog converter 196B.

The output of the switch 184 is coupled to the non-inverting input of the loop amplifier 190. The output of the loop amplifier 190 is the difference between the voltage coupled to its non-inverting input port and its inverting input port times a voltage gain A, where the voltage gain is typically a large positive constant. The output of the loop amplifier 190 is coupled to the input of the loop filter 192. In the preferred embodiment, the loop filter 192 is an analog low pass filter but can be embodied in other forms. In one embodiment, the loop amplifier 190 and loop filter 192 act as an integrator.

The output of the loop filter 192 is coupled to the input of the even-phase edge-triggered comparator 194A and also to the input of the odd-phase phase edge-triggered comparator 194B. The clock inputs of the even-phase edge-triggered comparator 194A and the odd-phase edge-triggered comparator 194B are coupled to the conversion clock, CLK. The even-phase edge-triggered comparator 194A and odd-phase edge-triggered comparator 194B are clocked using opposite edges of the comparison clock, CLK. For example, in one embodiment, the even-phase edge-triggered comparator 194A performs a comparison on the rising edge of the comparison clock, CLK, and the odd-phase edge-triggered comparator 194B performs a comparison on the falling edge of the comparison clock, CLK.

The logic values output by the even-phase edge-triggered comparator 194A and the odd-phase edge-triggered comparator 194B are coupled to the input of the digital-to analog converter 196A and the digital-to-analog converter 196B, respectively. The outputs of the digital-to-analog converter 196A and digital-to-analog converter 196B are combined through the combiner 188 and drive the inverting input of the loop amplifier 190. In one embodiment, the combiner 188 simply adds the two values together. In another embodiment, the combiner 188 time-division multiplexes the values into the loop. One useful attribute of the first embodiment of the combiner 188 is that linearity can be achieved without tight matching between the digital-to-analog converter 196A and the digital-to-analog converter 196B since their respective outputs are effectively averaged before being presented to the loop amplifier.

In one embodiment, the outputs of edge-triggered comparator 194A and edge-triggered comparator 194B are also coupled to the decimation filter 66 in a similar manner to the single-sampled case. In such an embodiment, typically the architecture of the decimation filter 66 is appropriately modified to accommodate processing the samples in the form of two bit serial words instead of a single high speed serial bit stream.

Due to the continuous time nature of the invention, the invention is not limited in dynamic range in the way that the prior art systems were. For this reason, in many applications, there is no need to incorporate automatic gain control into the front end of the receiver. For example, referring back to FIGS. 2, 3 and 4, note that the amplitude of the incoming waveform applied to the complementary amplifier 76 is in fixed proportion of an amplitude of a signal strength received by the antenna 50 because no automatic gain control mechanism is included. The elimination of the need for automatic gain control also decreases the need for stringent filtering that was previously used to avoid saturation of the automatic gain control. If no stringent filtering is used, the invention can be implemented on a single substrate. Implementation on a single substrate has advantageous results in the size, power consumption and performance of the invention. In the preferred embodiment, an antenna signal is filtered to prevent aliasing out-of-band signal and noise power into a desired signal band such as shown by filter 52 of FIG. 2. The frequency of the conversion clock can be selected from the range of frequencies passed by the filter.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of receiving a wireless transmission comprising the steps of:
   inverting the polarity of an incoming waveform corresponding to said wireless transmission on every one half clock cycle of a conversion clock having a predetermined frequency to produce a commutated waveform, thereby translating said incoming waveform downward in frequency; and
   converting said commutated waveform to a series of representative digital values using a delta-sigma modulator clocked by said conversion clock operating at said predetermined frequency.

2. The method of claim 1, wherein said incoming waveform is centered about a radio frequency and carries a modulated signal, wherein said conversion clock has a frequency approximately equal to said radio frequency, and said series of representative digital values are representative of said modulated signal.

3. The method of claim 2, further comprising the step of digitally filtering said series of representative digital values according to programmable filter characteristics wherein said programmable filter characteristics are selected based upon a type of modulation of said modulated signal.

4. The method of claim 1, wherein said step of inverting comprises the steps of:
   producing an inverted signal representation of said incoming waveform;
   producing a non-inverted signal representation of said incoming waveform;
   coupling said inverted signal representation to a first input port of a switch;
   coupling said non-inverted signal representation to a second input port of said switch; and
   coupling said conversion clock to a control port of said switch.

5. The method of claim 1, wherein said incoming waveform is received over an antenna and wherein an amplitude of said incoming waveform is in fixed proportion to an amplitude of a signal strength received by said antenna.

6. The method of claim 1, further comprising the step of filtering an antenna signal to prevent aliasing out-of-band signal and noise power into a desired signal band, said step of filtering producing said incoming waveform, and wherein a frequency of said conversion clock is selected from a range of frequencies passed in said step of filtering.

7. A circuit employed in a receiver comprising:
   a continuous time commutator configured to be coupled to a digital conversion clock and configured to invert the polarity of an incoming communication signal applied to an input port on every half clock cycle of said digital conversion clock having a predetermined frequency and to produce a commutated signal at an output port, thereby translating said incoming signal downward in frequency; and
   a delta-sigma modulator having a clock input port coupled to said digital conversion clock operating at said predetermined frequency, having a signal input port coupled to said output port of said continuous time commutator and having an output port configured to produce a series of digital values representative of a modulation waveform carried by said incoming signal.

8. The circuit employed in the receiver of claim 7, wherein said continuous time commutator comprises:
   a complementary amplifier configured to receive said incoming signal and to produce an inverted version of said incoming signal at an inverted output port and to produce a non-inverted version of said incoming signal at a non-inverted output port; and
   a switch having a first input port coupled to said inverted output port, having a second input port coupled to said non-inverted output port and having a control port coupled to said digital conversion clock.

9. The circuit employed in the receiver of claim 7, wherein said delta-sigma modulator comprises:
   a loop amplifier having a first input port coupled to said output port of said continuous time modulator, having a second input, and having an output port;
   a continuous time loop filter coupled to said output port of said loop amplifier and having an output port;
   an edge-triggered comparator coupled to said output port of continuous time loop filter, having a clock input coupled to said digital conversion clock and having an output port; and
   a one-bit digital to analog converter having an input port coupled to said output port of said edge-triggered comparator and having an output port coupled to said second input of said loop amplifier.

10. The circuit employed in the receiver of claim 7, further comprising a programmable digital filter having an input port coupled to said output of said delta-sigma modulator, said programmable digital filter configured to filter said series of digital values according a filter characteristics selected based upon a type of modulation of said modulation waveform.

11. The circuit employed in the receiver of claim 7, further comprising an antenna coupled to said continuous time commutator so as to receive said incoming signal, wherein an amplitude of said incoming signal is in fixed proportion to an amplitude of a signal strength received by said antenna.

12. The circuit employed in the receiver of claim 7, further comprising a filter configured to receive an antenna signal and configured to prevent aliasing of out-of-band signal and noise power into a desired signal band, said filter coupled to said input port of said continuous time commutator, wherein a frequency of said conversion clock is selected from a range of frequencies passed by said filter.

13. An apparatus for receiving a wireless transmission comprising:
   means for inverting the polarity of an incoming waveform representative of said wireless transmission on every one half clock cycle of a conversion clock having a predetermined frequency to produce a commutated waveform, thereby translating said incoming waveform downward in frequency; and
   means for converting said commutated waveform to a series of representative digital values using a delta-sigma modulator clocked by said conversion clock operating at said predetermined frequency.

14. The apparatus of claim 13, wherein said incoming waveform is centered abut a radio frequency and carries a modulated signal, wherein said conversion clock has a frequency approximately equal to said radio frequency, and said series of representative digital values are representative of said modulated signal.

15. The apparatus of claim 14 further comprising means for digitally filtering said series of representative digital values according to programmable filter characteristics wherein said programmable filter characteristics are selected based upon a type of modulation of said modulated signal.

16. The apparatus of claim 13, wherein said means for inverting comprises:

means for producing an inverted signal representation of said incoming waveform;

means for producing a non-inverted signal representation of said incoming waveform;

means for coupling said inverted signal representation to a first input port of a switch;

means for coupling said non-inverted signal representation to a second input port of said switch; and means for coupling said conversion clock to a control port of said switch.

17. The apparatus of claim 13, wherein said incoming waveform is received over an antenna and wherein an amplitude of said incoming waveform is in fixed proportion to an amplitude of a signal strength received by said antenna.

18. The apparatus of claim 18, further comprising means for filtering an antenna signal to prevent aliasing out-of-band signal and noise power into a desired signal band, said means for filtering producing said incoming waveform, and wherein a frequency of said conversion clock is selected from a range of frequencies passed in said means for filtering.

19. A method of receiving a wireless transmission comprising:

multiplying an incoming waveform by +1 and −1 on alternating half cycles of a conversion clock to produce a commutated waveform, thereby translating the incoming waveform downward in frequency;

converting the commutated waveform to a series of representative digital values using a delta-sigma modulator clocked at a frequency equal to the conversion clock;

wherein the incoming waveform comprises a baseband frequency signal modulated at a carrier frequency, and the conversion clock has a frequency of approximately the carrier frequency;

whereby the multiplying step produces a signal of approximately the baseband frequency; and wherein the incoming waveform has a frequency of greater than 1 MHz, and the multiplying and converting steps downconvert the incoming signal directly to a baseband frequency without needing to first downconverting the incoming signal to an intermediate frequency.

* * * * *